(12) United States Patent
Hunt

(10) Patent No.: US 7,999,245 B2
(45) Date of Patent: Aug. 16, 2011

(54) NETWORK CENTRIC DIRECTED ENERGY SYSTEMS

(75) Inventor: Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 420 days.

(21) Appl. No.: 12/336,190

(22) Filed: Dec. 16, 2008

(65) Prior Publication Data

US 2010/0148033 A1 Jun. 17, 2010

(51) Int. Cl.
*G01J 1/20* (2006.01)
(52) U.S. Cl. ............... 250/559.29; 250/201.2; 356/498
(58) Field of Classification Search ............ 250/559.29, 250/201.2; 356/498
See application file for complete search history.

(56) References Cited

U.S. PATENT DOCUMENTS 4,710,604 A * 12/1987 Shirasu et al. ............... 356/498

* cited by examiner

*Primary Examiner* — Seung C Sohn
(74) *Attorney, Agent, or Firm* — Yee & Associates, P.C.

(57) ABSTRACT

A system is provided where the system comprises a plurality of optical sources, each optical source configured to generate an optical beam and direct the optical beam from each of the plurality of optical sources towards a target; a beam discriminator module configured to monitor a parameter for each optical beam generated from each of the optical source; and a position sensor configured to receive a feedback from the beam discriminator module based on the monitored parameter; wherein based on the feedback, the position sensor determines if any optical beam at the target is off-target.

21 Claims, 4 Drawing Sheets

NETWORK CENTRIC DIRECTED ENERGY SYSTEMS

BACKGROUND

1. Technical Field

The present disclosure relates to directed energy systems.

2. Related Art

Directed energy systems are commonly used in various airborne or terrestrial platforms to communicate with one or more targets. Typically, a directed energy system may emit, direct and transfer a selected amount of energy to a target for a desired effect. In this case, energy specifically implies energy that is transferred by the propagation of electro-magnetic radiation. An example of a directed energy system operating at a platform is a laser source emitting a laser beam.

The term "platform" (may also be referred to as "source") as used herein, includes aircrafts, helicopters, satellites, automobiles and any terrestrial or airborne vehicle. For purposes of this disclosure, a target may be an aircraft, helicopter, satellite, automobile, any terrestrial or airborne vehicle, a building or any other object.

Typically, directed energy systems use a direct, point to point architecture to communicate with targets. A direct, point to point architecture needs a clear line of sight for effective communication and a desired effect. In a real life situation, for example, in a tactical battle field, a clear line of sight between a directed energy system and a target may be difficult to obtain. This is one shortcoming of conventional directed energy system communication architecture.

Another shortcoming of the conventional architecture for using directed energy systems is that they are platform centric, i.e., the platform that hosts the directed energy system has to carry other equipment for effectively operating the directed energy system. For example, a laser system with a missile defense mission includes all the laser power for the mission within its payload. The system also includes equipment for illumination lasers, tracking systems, hardware for operating various components and a power source. A platform may not always able to support high energy equipment and the devices associated with a directed energy system. This may limit the overall application and effectiveness of a directed energy system.

Therefore, it is desirable to have a network centric directed energy system that is able to distribute functions and capabilities of directed energy systems while allowing individual sensing and control of the energy sources. Conventional directed energy systems fail to provide such characteristics.

SUMMARY

In one embodiment a system is provided. The system includes a plurality of optical sources, each optical source configured to generate an optical beam and direct the optical beam from each of the plurality of optical sources towards a target; a beam discriminator module configured to monitor a parameter for each optical beam generated from each of the optical source; and a position sensor configured to receive a feedback from the beam discriminator module based on the monitored parameter; wherein based on the feedback, the position sensor determines if any optical beam at the target is off-target.

In another embodiment a system is provided. The system includes a plurality of optical sources, each optical source configured to generate an optical beam and direct the optical beam from each of the plurality of optical sources towards a target; a plurality of beam discriminator modules, wherein one beam discriminator module is dedicated to one optical source to monitor a parameter for an optical beam generated from the optical source; and a position sensor configured to receive a feedback from each of the beam discriminator modules based on the monitored parameter for each of the optical source; wherein based on the feedback, the position sensor determines if any optical beam at the target is off-target.

In yet another embodiment, a method is provided. The method includes (a) configuring a plurality of incoherent optical sources; (b) generating and directing an optical beam from each of the plurality of optical sources to a target; (c) selecting an optical beam for monitoring from among the plurality of optical beams directed at the target in step (b), wherein a beam discriminator module selects the optical beam; (d) providing a feedback regarding the selected beam to a position sensor; (e) determining if the selected target beam is off target based on the feedback; and (f) if the beam is off target in step (e), re-configuring a parameter of the optical source generating the off-target optical beam.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

In one embodiment, a method and system for incoherently combining a plurality of energy sources to provide a cumulative effect at a target, is provided. The energy sources may be located at different geographical locations.

In one example, the energy sources produce optical beams, for example, a laser beam, which may be directed at the target. Due to incoherent nature of the energy sources, the optical beams may vary in intensity, wavelength, polarization or bandwidth. Furthermore, due to incoherent nature of optical sources, tracking and pointing of each optical source is also not related. This difference in optical parameters of optical sources enables tracking, monitoring and control over each optical beam generated from an optical source.

To facilitate an understanding of a directed energy system, a general overview of a directed energy system will be described. The specific structural components of a network centric directed energy system will then be described with specific reference to general structure of a directed energy system.

Directed energy systems typically emit, direct and transfer a selected amount of energy to a target for a desired effect. Directed energy may be transferred in various forms including electromagnetic radiation and particles with mass, for example, particle beam weapons.

A commonly used directed energy system transmits a laser beam. As an example, directed energy systems based on laser beams are described below. The adaptive embodiments disclosed herein are not limited to a laser beam source; any other energy source may be used in the network centric architecture, described below.

Figure 1:
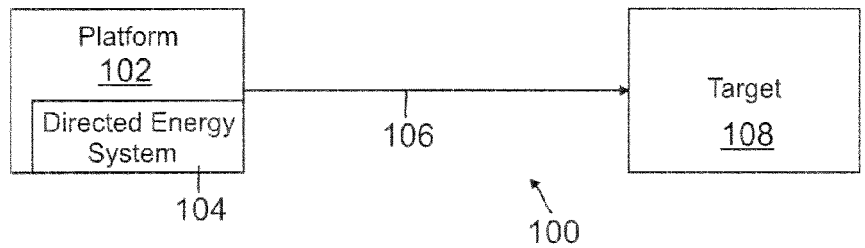
FIG. 1 shows a conventional, point to point architecture for using a direct energy system.

Point to Point Architecture:

FIG. 1 shows a conventional system 100 using a direct, point to point connection between a directed energy system (also referred to as "DES") 104 on a platform 102 and a target 108. DES 104 may be an optical source that emits laser beams 106. DES 104 includes associated hardware for acquisition, tracking and pointing laser beams at target 108. The level of influence (or extent of damage) on target 108 is directly proportional to the amount of energy directed from DES 104 and then received at target 108.

For creating a high level of influence, for example, damage at target 108, high energy laser beams are used by DES 104. High energy laser beams, typically need high operational power levels, for example, 100 Kw or more. Typically, construction of optical sources generating such high energy lasers is difficult. Furthermore, it may be difficult for platform 102 to accommodate the use of such high energy lasers, the associated hardware and equipment. The weight associated with such equipment and hardware may also be unacceptable for certain platform types, for example, space shuttle, aircrafts and others.

Therefore, a network centric directed energy system is required. The network centric, directed energy systems have energy systems distributed over various platforms, where each platform is capable of influencing a common target. The embodiments described herein attempt to overcome the shortcomings of system 100.

Figure 2A:
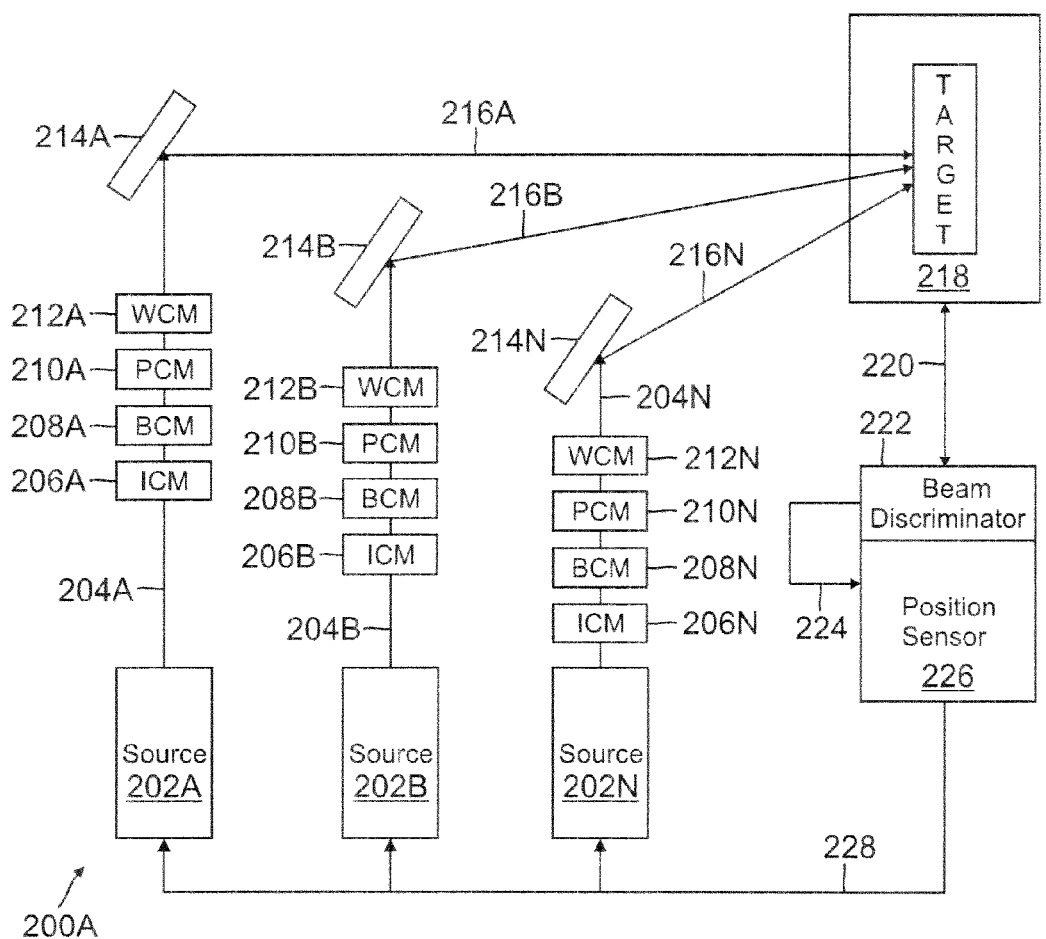
FIG. 2A shows a network centric architecture for using direct energy systems, according to one embodiment.

Network Centric Architecture:

FIG. 2A shows a generic system 200A (also referred to as system 200A) that uses a network centric architecture for incoherently combining energy produced by a plurality of energy sources 202A-2Q2N. For achieving a desired outcome or influence, the energy from the plurality of energy sources 202A-202N is directed at a common target 218.

In one example, each of source 202A-202N (may also be referred to as optical source 202A-202N) is an optical source for individually producing optical beams (referred to interchangeably as laser beams) 204A-204N. Each optical source 202A-202N may be situated at a different geographical location.

Optical sources 202A-202N are incoherent with respect to each other and may use different wavelength, polarisation, intensity and/or bandwidth. In one embodiment, the different optical beam parameters are controlled individually to track and control individual laser beams 204A-204N.

Each optical source 202A-202N may include an associated beam conditioner for individually, monitoring and controlling parameters of optical beams 204A-204N, such as intensity, bandwidth, polarization and wavelength. For example, optical source 202A may include an intensity control module 206A (or intensity control beam conditioner, or "ICM"), bandwidth control module 208A (bandwidth control beam conditioner or "BCM"), polarization control module 210A (polarization beam conditioner or "PCM"), and wavelength control module (wavelength beam conditioner or "WCM") 212A.

ICM 206A monitors optical beam 204A and controls the intensity of optical beam 204A. BCM 208A monitors optical beam 204A and controls the bandwidth of optical beam 204A. WCM 210A monitors optical beam 204A and controls the wavelength of optical beam 204A. PCM 212A also monitors optical beam 204A and controls the polarization of optical beam 204A.

Similar to optical source 202A, optical source 202B includes ICM 206B, BCM 208B, WCM 210B, and PCM 212B to monitor and control optical beam 204B. Optical source 202N includes ICM 206N, BCM 208N, WCM 210N, and PCM 212N to monitor and control optical beam 204N.

Each optical source 202A-202N may include an individual pointing system 214A-214N. Each pointing system 214A-214N includes optical elements for reflecting and redirecting optical beams 204A-204N towards target 218. In one embodiment, each of point system 214A-214N reflects beams 204A-204N. The reflected (or target) beams 216A-216N are then applied at target 213. It is to be understood that the terms target beam (216A-216N) and optical beam (204A-204N) are used interchangeably, and refers to a beam that is directed from an optical source to target 218.

System 200A may also include a beam discriminator module 222 that monitors (shown as 220) each beam that is applied at target 218. Beam discriminator module 222 traces the origin of each target beam 216A . . . 216N and tracks the behavior of each target beam at target 218.

The structure and nature of beam discriminator module 222 depends on the parameter that is being monitored. For example, beam discriminator module 222 may be a polarization discriminator for monitoring and analyzing polarization of each optical beam 216A-216N. Beam discriminator module 222 may be wavelength sensor that monitors wavelength of the target beam 216A-216N.

In another example, beam discriminator module 222 may be intensity based discriminator that monitors the intensity of target beams 216A-216N. In yet another example, beam discriminator module 222 may be bandwidth based discriminator that monitors the bandwidth of target beams 216A-216N.

If the optical sources 202A-202N operate at different wavelength, then a wavelength beam discriminator is used. A polarization discriminator is used if the optical source 202A-202N has different polarization. Thus the use of beam discriminator module 222 may be customized based on the nature and structure of source 202A-202N.

Based on tracking 220, beam discriminator module sends a feed back signal 224 to a position sensor 226. Based on feedback 224, position sensor 226 analyzes the position of an optical source and determines if any of the target beam 216A-216N is off target. If any beam is off target (for example, 216N), position sensor 226 sends a feedback signal (for example, 228) to the affected optical source (for example, 202N).

Based on feedback 228, optical source 202N adjusts its optical beam 204N using one or more of ICM 206N, BCM 208N, PCM 210N and WCM 212N, to ensure that the target beam 216N stays on target 218.

Figure 2B:
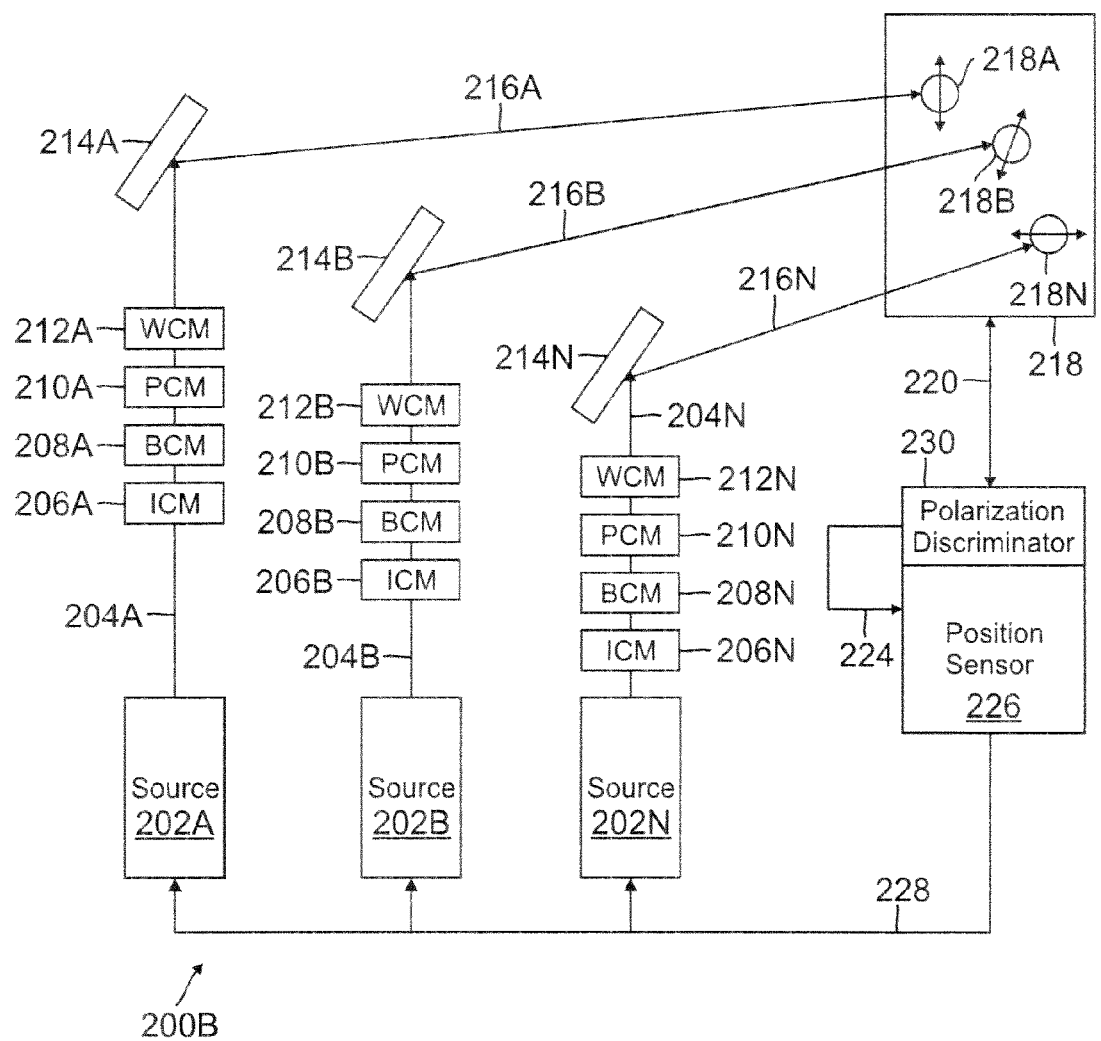
FIG. 2B shows a network centric architecture having a polarization discriminator, according to one embodiment.
Figure 2C:
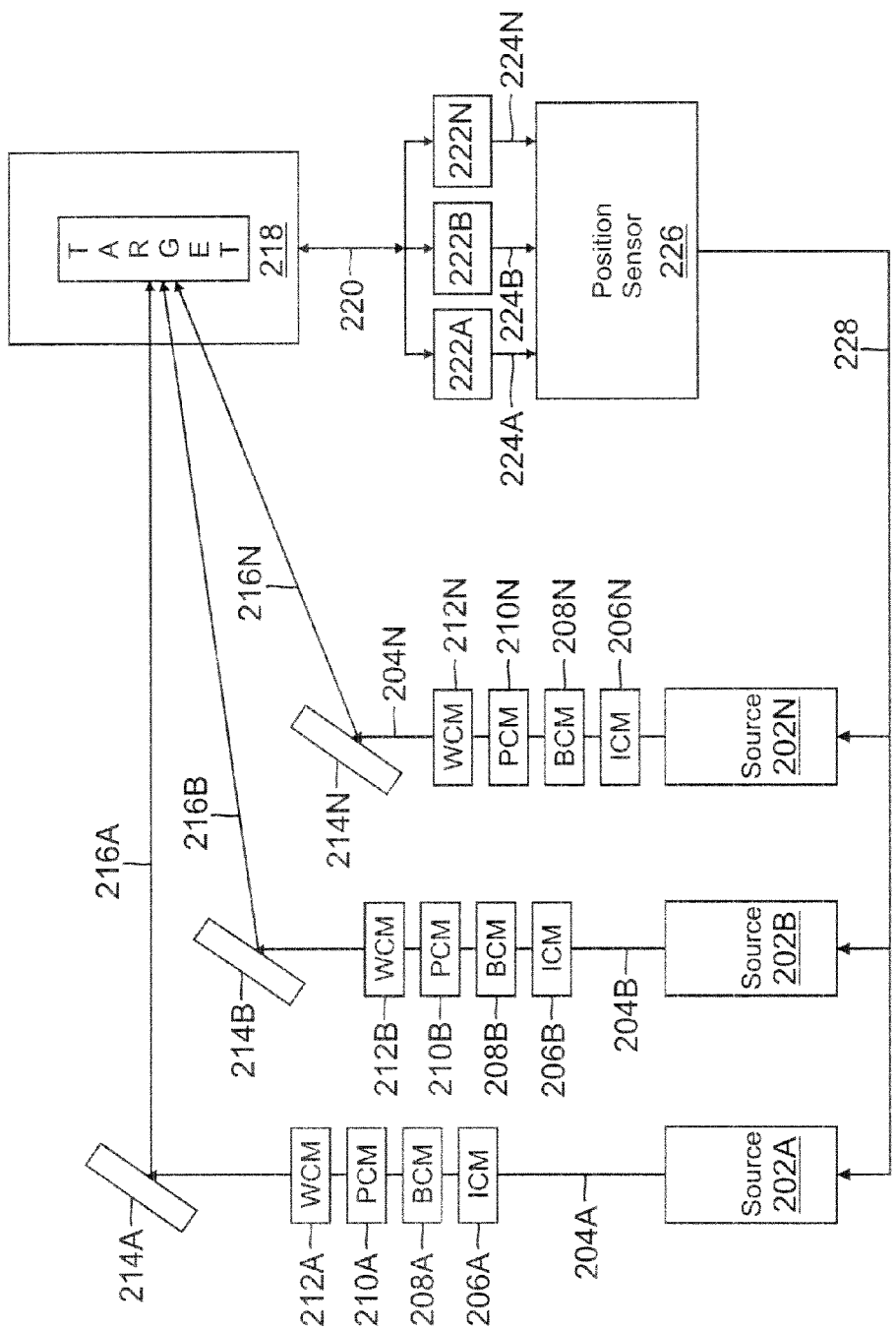
FIG. 2C shows a network centric architecture having a plurality of beam discriminators, according to one embodiment.

FIG. 2B shows a system 200B that has various common elements with system 200A, described above with respect to FIG. 2A. In system 200B, the beam discriminator is a polarization discriminator 230, and monitors polarization of each target beam 216A-216N. Polarization discriminator 230 may be a linear polarizer or any other device that tracks the polarization of a target beam.

At target 218, each beam's 216A-216N polarization is clocked to a different rotational position (shown as 218A-218N). Due to polarization ragging, i.e., slight rotation of the polarization state of each beam 216A-216N with respect to each other, polarization discriminator 230 senses the polarization of each beam and the position and state of each beam 216A-216N. Feedback 224 is then provided to position sensor 226, based on the polarization, position and beam state information.

As the polarization discriminator 230 rotates, it maximizes transmission of a target beam whose polarization axis aligns with its own axis (for example, 218A). Although some light is collected from other beam polarization, the dominant intensity comes from the beam whose axis is in alignment with polarization discriminator 230. With that unique identification, polarization discriminator 230 determines if any of the target beams is off target 218. If any of the beam is off target 218, position sensor 226 communicates (via 228) with its optical source as explained above with respect to FIG. 2A above.

In one embodiment, beam discriminator module 222 includes a wavelength sensor for detecting the wavelength of each optical source 202A-202N. The wavelength is provided to position sensor 226. Based on the wavelength information, position sensor 226 may direct an optical source to re-configure its optical beam the associated target beam is off target, as explained above with respect to FIG. 2A.

In yet another embodiment, system 200C is provided where each optical source (202A-202N) is provided with a dedicated beam discriminator module 222A-222N for monitoring the target beam from each optical source. In this embodiment, each beam discriminator module 222A-222N is configured with the details of the optical beam generated by an optical source. For example, beam discriminator module 222A monitors and tracks optical source 202A, and its optical beam 204A. Beam discriminator module 222B monitors optical source 202B and beam discriminator module 222N monitors optical source 222N Beam discriminator module 222A is provided with intensity information received from ICM 206A, bandwidth information from BCM 208A, wavelength information from WCM 212A, and polarization information from PCM 210A. Beam discriminator module 222A monitors target beam 216A parameters (i.e. intensity, bandwidth, wavelength and/or polarization) and provides feedback 224A to position sensor 226. If target beam 216A is off target, position sensor communicates (228) with optical source 202A so that optical-beam 204A can be reconfigured. After beam 204A is reconfigured beam discriminator module 222A continues to monitor target beam 216A so ensure that target beam 216A stays on a desired path at target 218.

Figure 3:
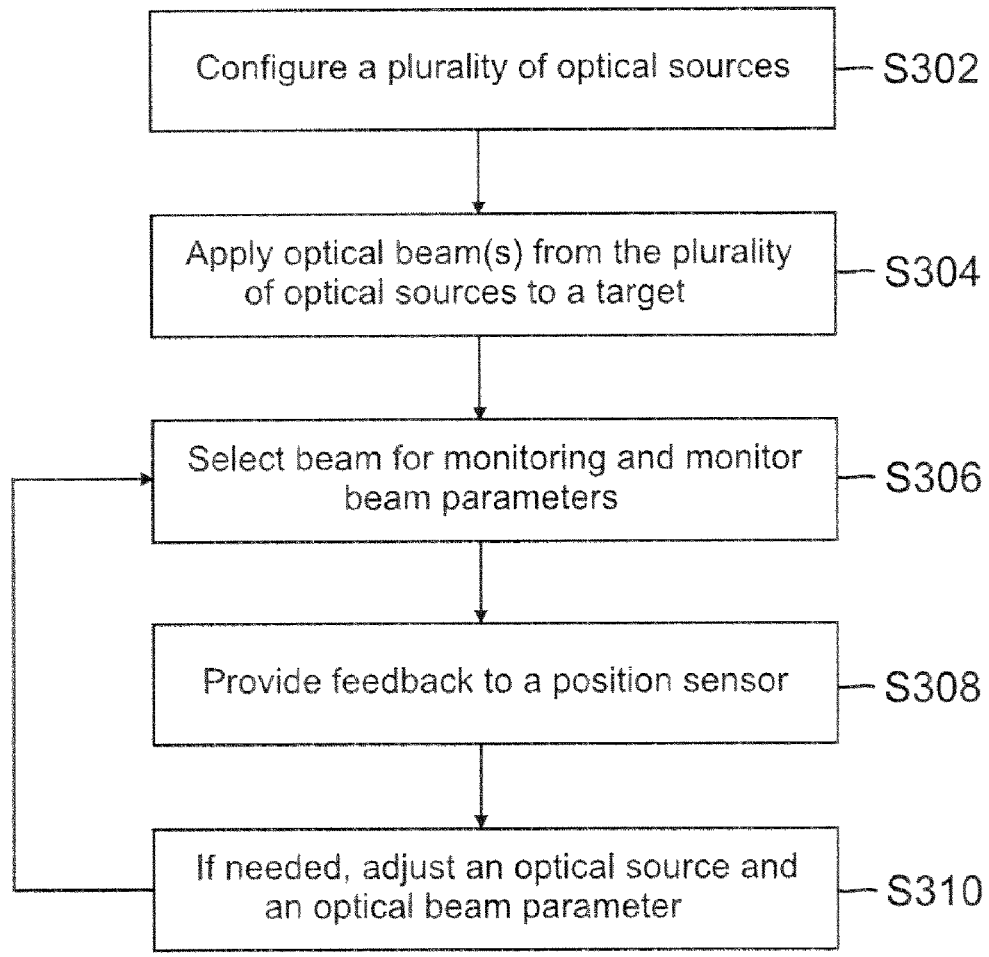
FIG. 3 shows a flow diagram for using a network centric directed energy system, according to one embodiment.

Process Flow:

FIG. 3 shows a process for networked source, according to one embodiment. The process begins in block S302, when a plurality of optical sources (for example, 202A-202K) are configured to generate and aim an optical beam at a common target 218. Configuring an optical source includes configuring its associated ICM (206A-206N), BCM (208A-208N), PCM (210A-210N) and WCM (212A-212N) and pointing system (214A-214N). Beam discriminator module 222 is also configured based on the incoherent parameters of each optical source.

In block S304, each optical source 202A-202N generates an optical beam 204A-204N for the target 218. Target 218 receives a plurality of target beams 216A-216N.

In block S306, beam discriminator module 222 selects a target beam (for example, 216A) for monitoring. Beam discriminator module 222 monitors target beam parameters (for example, intensity, bandwidth, polarization and/or wavelength) based on the configuration in block S304. In block S308, beam discriminator module 222 provides the monitored information for the selected target beam (216A) to position sensor 226.

In block S310, position sensor 226 determines if the selected target beam (216A) is on target. If the target beam 216A is off target, position sensor 226 sends a feedback signal 228 to the affected optical source (for example, 202A) to re-configure beam parameters for optical source 202A. If the target beam 216A is on target, the process moves back to block S304, where beam discriminator module 222 selects another target beam (e.g. 216B).

For purposes of this disclosure it is shown that a position sensor monitors one target beam at a time. It is within the scope of this disclosure to have a position sensor that simultaneously monitors all the optical sources with inputs from beam discriminator module 222. For example, system 200C provides simultaneous monitoring of target beams 216A-216N where dedicated beam discriminator modules 222A-222N simultaneously monitor target beams 216A-216N and provide feedback 224A-224N to position sensor 226.

This disclosure provides a network centric architecture and process that combines output from different energy sources and applies energy to one or more targets. Each individual energy source can be configured and monitored to provide a desired effect at the target. Because, multiple sources can be used and controlled, one does not need to have a single "high" energy source with high power requirements.

In another embodiment, multiple platforms may house individual energy sources. Because multiple energy sources operate at different platforms one may obtain a desired result efficiently and accurately.

Although the present disclosure has been described with reference to specific embodiments, these embodiments are illustrative only and not limiting. Many other applications and embodiments of the present disclosure will be apparent in light of this disclosure and the following claims.

What is claimed is:

1. A system, comprising:
   a plurality of optical sources, each optical source of the plurality of optical sources configured to generate an optical beam and to direct the optical beam towards a same target;
   a beam discriminator module configured to monitor a parameter for the optical beam generated by each optical source of the plurality of optical sources; and
   a position sensor configured to receive a feedback from the beam discriminator module based on the monitored parameter; wherein based on the feedback, the position sensor determines if the optical beam from any of the plurality of optical sources at the target is off-target.

2. The system of claim 1, wherein the position sensor is further configured to communicate with the plurality of optical sources.

3. The system of claim 1, wherein the position sensor is further configured to provide a feedback to the optical source that generates the optical beam that is off target.

4. The system of claim 1, wherein each optical source includes an associated wavelength control module, an intensity control module, a bandwidth control module, and a polarization control module.

5. The system of claim 1, wherein each optical source includes an associated pointing system for pointing a generated optical beam to the target.

6. The system of claim 1, wherein the plurality of optical sources are incoherent.

7. The system of claim 1, wherein each generated optical beams from the plurality of optical sources have at least one different beam parameter from each other.

8. The system of claim 1, wherein the beam discriminator module is a polarization discriminator that monitors optical beam polarization.

9. The system of claim 1, wherein the beam discriminator module is a wavelength discriminator that monitors optical beam wavelength.

10. The system of claim 1, wherein the beam discriminator is an intensity discriminator that monitors optical beam intensity.

11. A system, comprising:
a plurality of optical sources, each optical source of the plurality of optical sources configured to generate an optical beam and to direct the optical beam towards a same target;
a plurality of beam discriminator modules, wherein each beam discriminator module of the plurality of beam discriminator modules is dedicated to a different optical source of the plurality of optical sources to monitor a parameter for an optical beam generated from the optical source; and
a position sensor configured to receive a feedback from each beam discriminator module of the plurality of beam discriminator modules based on the monitored parameter for each optical source of the plurality of optical sources;
wherein based on the feedback, the position sensor determines if the optical beam from any of the plurality of optical sources at the target is off-target.

12. The system of claim 11, wherein the position sensor is further configured to communicate with the plurality of optical sources.

13. The system of claim 11, wherein the position sensor is further configured to provide a feedback to the optical source that generates the optical beam that is off target.

14. The system of claim 11, wherein each optical source includes an associated wavelength control module, an intensity control module, a bandwidth control module, and a polarization control module.

15. The system of claim 11, wherein each optical source includes an associated pointing system for pointing a generated optical beam to the target.

16. The system of claim 11, wherein the plurality of optical sources are incoherent.

17. The system of claim 11, wherein each generated optical beams from the plurality of optical sources have at least one different beam parameter from each other.

18. The system of claim 1, wherein the beam discriminator module is one or more of a polarization discriminator that monitors optical beam polarization; a wavelength discriminator that monitors optical beam wavelength; and an intensity discriminator that monitors optical beam intensity.

19. A method, comprising:
configuring a plurality of incoherent optical sources;
generating and directing an optical beam from each optical source of the plurality of optical sources to a same target;
selecting an optical beam for monitoring from among the plurality of optical beams directed at the target, wherein a beam discriminator module selects the optical beam;
providing a feedback regarding the selected optical beam to a position sensor;
determining if the selected optical beam is off-target based on the feedback; and
responsive to determining that the selected optical beam is off-target, re-configuring a parameter of the optical source of the plurality of optical sources that generated the off-target optical beam.

20. The method of claim 19, wherein configuring the plurality of incoherent optical sources includes configuring one or more of intensity, polarization, wavelength and bandwidth parameters for each optical source.

21. The method of claim 19, wherein the beam discriminator module is one or more of a polarization discriminator that monitors optical beam polarization; a wavelength discriminator that monitors optical beam wavelength; and an intensity discriminator that monitors optical beam intensity.

* * * * *